United States Patent [19]
Bartlo et al.

[11] 3,856,097
[45] Dec. 24, 1974

[54] AUTOMATIC SCALE CONTROL SYSTEM AND METHODS

[76] Inventors: John S. Bartlo, Ridgewood, N.J.; Richard W. Safranski; Charles G. Hart; David A. Wieseckel, all of P.O. Box 571, Sheboygan, Wis. 53081

[22] Filed: Dec. 28, 1973

[21] Appl. No.: 429,698

Related U.S. Application Data

[62] Division of Ser. No. 321,531, Feb. 5, 1973, abandoned.

[52] U.S. Cl. .................................. 177/1, 177/123
[51] Int. Cl. ............................................ G01g 13/02
[58] Field of Search ...................... 177/1, 121–123

[56] References Cited
UNITED STATES PATENTS

| | | | |
|---|---|---|---|
| 2,933,281 | 4/1960 | Hyde et al. | 177/121 |
| 3,108,647 | 10/1963 | Harmon et al. | 177/121 X |
| 3,498,395 | 3/1970 | Henry | 177/1 |
| 3,752,244 | 8/1973 | Rouban | 177/123 X |
| 3,763,943 | 10/1973 | Bullivant | 177/123 X |

*Primary Examiner*—George H. Miller, Jr.
*Attorney, Agent, or Firm*—Koenig, Senniger, Powers and Leavitt

[57] ABSTRACT

An automatic scale control system for weighing continuous batches of a fluent product. A product weight-measuring scale includes means for receiving the fluent product for weighing and means for subsequently discharging a batch of the weighed product. A bulk feed delivers the product from a supply to the scale at a bulk rate and a dribble feed delivers the product from the supply to the scale at a dribble rate lower than the bulk rate. Circuitry is provided for initiating delivery of the product by the bulk and dribble feeds and an arrangement is operable by the scale for terminating delivery by the bulk feed when the product delivered to the scale reaches a total first weight. Means operable by the scale terminates delivery by the dribble feed when the product delivered to the scale reaches a total weight bringing the batch on the scale up to predetermined finish weight whereupon it is discharged. A timer establishes a time interval during which the product delivered to the scale is to reach said second weight and provision is included for changing the bulk rate if the product delivered within the time interval does not reach said second weight so as to cause the second weight to be reached within the time interval.

15 Claims, 2 Drawing Figures

3,856,097

AUTOMATIC SCALE CONTROL SYSTEM AND METHODS

This is a division of application Ser. No. 321,531, filed January 5, 1973 now abandoned.

BACKGROUND OF THE INVENTION

This invention relates to automatic batch weighing of a fluent product and more particularly to an improved automatic scale control system and methods for weighing repetitive batches of such a fluent product.

In the batch weighing of fluent products including granular, pelletized and other products which tend to flow, an advantageous type of weighing is known as bulk-and-dribble weighing. This involves the delivery of the product to a scale bucket or the like at two different delivery rates, i.e., a first or so-called bulk delivery rate and a reduced second or so-called dribble delivery rate by means of two different feed arrangements. In this type of weighing, feed at both the bulk and dribble delivery rate is initiated to fill the scale bucket relatively rapidly. When the product delivered to the scale bucket reaches a first weight, the bulk delivery is terminated and the bucket continues to be supplied with the product at the lesser dribble delivery rate. When a second weight of the scale bucket is reached, the dribble delivery is also terminated so that the amount of product in the scale bucket equals the predetermined finish weight. The scale bucket is then dumped to deliver the batch of the product for filling a bag or other package, for example.

Such bulk-and-dribble weighing can be used for high-speed batch weighing, as in product line filling applications or the like where it is important to achieve not only uniformly accurate weighing but also such weighing at a uniform speed, regardless of certain variables that may tend to affect it. These variables include, for example, change in the density of the product; change in its moisture; change in its shape or configuration; change in temperatures; change associated with the storage of the product in a hopper, e.g., so-called bridge or head change; build-up of the product on feed means which supply the product to the scale bucket; fluctuation in voltage causing change in the rate of delivery by the feed means; and misadjustment or unauthorized adjustment of the control apparatus. Because of variation in rate (and/or speed of delivery) caused by such variables, bulk-and-dribble weighing systems of the prior art have required the use of additional sensors, check weighers, or duplicate scales.

SUMMARY OF THE INVENTION

Among the several objects of the invention may be noted the provision of an improved automatic scale control system and methods for weighing repetitive batches of a fluent product; the provision of such an automatic scale system and methods providing accurate batch weighing at a uniform speed substantially without regard to the effect of variables of the type described above; the provision of such an automatic scale control system and methods eliminating the need for additional sensors, check weighers, or duplicate scales; the provision of such an automatic scale control system which, having once been adjusted, is thereafter self-adjusting in operation, and which does not require a skilled operator or fine adjustment by the operator during operation of the system; the provision of such an automatic scale control system in which the delivery rates are controlled in such a manner that loss of control of the feed rates does not occur, and in which the feed rate is automatically controlled to insure that a given number of batches will be accurately weighed within a predetermined length of time.

Briefly, an automatic scale control system according to the invention is useful for weighing repetitive batches of a fluent product, each batch being of predetermined finish weight. The system includes a product weight-measuring scale with means for receiving the fluent product for weighing and means for subsequently discharging a batch of the weighed product. A first feed means is provided for delivering the product from a supply thereof to the scale at a preselected first delivery rate, and a second feed means is provided for delivering the product from the supply thereof to the scale at a preselected second delivery rate which is lower than the first delivery rate, with means for initiating delivery of the product by the first and second feed means, and means operable by the scale for terminating delivery by the first feed means when the product delivered to the scale reaches a predetermined total first weight. Means is operable by the scale for terminating delivery by the second feed means when the products delivered to the scale reaches a predetermined total second weight. The system further includes means for establishing a predetermined time interval during which the product delivered to the scale is to reach one of said predetermined total first or second weights, and means for automatically changing at least one of said delivery rates if said one of the predetermined total first and second weights of product is not delivered within said predetermined time interval so as to cause said one of the predetermined total first or second weights of product to be delivered to the scale within said predetermined time interval.

The automatic scale control system operates according to a method which comprises initiating the delivery of the fluent product to a scale via first feed means at a first delivery rate; initiating delivery of the product to the scale via second feed means at a second delivery rate which is substantially lower than said first rate; terminating delivery of the product to the scale at said first rate when a predetermined total first weight of product delivered to the scale is weighed by the scale; terminating delivery of the product at said second rate when a predetermined total second weight of product delivered to the scale is weighed by the scale whereby a batch of said predetermined finish weight is accumulated on the scale; establishing a predetermined time interval during which the predetermined total second weight of product weighed by the scale is to be reached; automatically changing at least one of said first and second delivery rates if the predetermined total second weight weighed by the scale is not reached within said time interval so as to cause said predetermined second weight weighed by the scale to be reached within said time interval; discharging from the scale the product batch of said predetermined finish weight; and repeating the foregoing steps.

Other objects and features will be in part apparent and in part pointed out hereinafter.

DESCRIPTION OF THE PREFERRED EMBODIMENT

Figure 1:
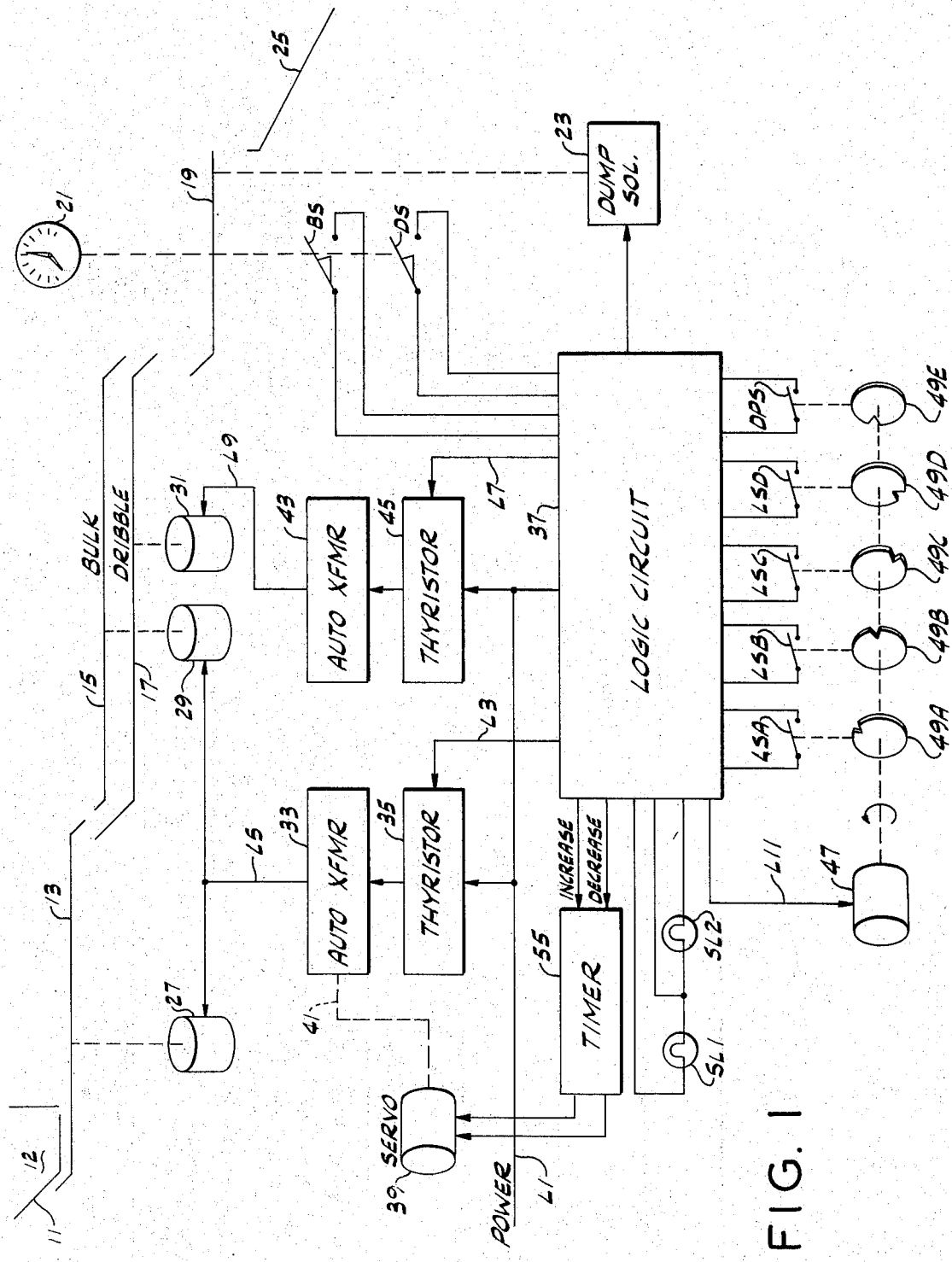
FIG. 1 is a schematic diagram in block-diagrammatic form of the present automatic scale control system.

Referring now to FIG. 1, an automatic scale control system of the invention is illustrated as being of type adapted for controlling bulk-and-dribble weighing of repetitive batches of a fluent product.

At 11 is indicated a hopper for holding a quantity 12 of the fluent product, such as a powder. The product is delivered from an opening at the bottom of hopper 11 by a main feed tray or conveyor 13 which is adapted to deliver the product to a so-called bulk feed tray or conveyor 15 and also to a so-called dribble feed tray or conveyor 17, each adapted to deliver the product to the bucket 19 or similar product-receiving means of a scale 21. Bucket 19 is adapted for being dumped in suitable manner, after weighing of a batch of predetermined finish weight, by means of a dump solenoid 23. The dumped batch is delivered by a chute 25 or other means for packaging or the like.

Each of the conveyors 13, 15 and 17 is illustrated as being of the type in which the product is conveyed by vibration. For this purpose, associated with main feed conveyor 13 is a vibrator unit 27; with bulk feed conveyor 15 a vibrator unit 29; and with dribble feed conveyor 17 a vibrator unit 31. Each such vibrator unit is of a commercially available electromagnetic type adapted for being supplied with 60-Hz a.c. power, the amplitude of vibration being a function of the voltage level.

Thus it will be understood that the product flow rate as to each of conveyors 13, 15 and 17 depends on the vibration amplitude and may be varied from a nominal product flow rate by controlling the level of the a.c. voltage with which the respective vibrators 27, 29 and 31 are energized. Main conveyor 13 may supply the product at a nominal flow rate such as about 5 oz./sec., bulk conveyor 15 at a nominal flow rate such as about 4 oz./sec., and dribble conveyor 17 at a nominal flow rate such as about 1 oz./sec. In accordance with the invention, the flow rates may be varied from these nominal rates as explained below.

A.c. power for energizing the system is provided by means of a lead L1 connected to the so-called hot side of a local source of a.c. power, it being understood that an a.c. neutral connection, though not shown, is also made. The a.c. power is supplied from lead L1 to a voltage-adjustable autotransformer 33 under the control of a thyristor (or so-called triac) 35 adapted to be gated by a signal supplied via a lead L3 from a logic circuit 37 which is explained below. The output voltage of autotransformer 33 is provided by a lead L5 to both main vibrator 27 and to bulk vibrator 29. The level of this output voltage is controlled by a servomotor (or simply servo) 39 whose rotor is suitably interconnected, as indicated at 41, with the control shaft of autotransformer 33. Thus servo 39 controls the magnitude of vibration of both vibrators 27 and 29.

Similarly, a.c. power from lead L1 is supplied to a second voltage-adjustable autotransformer 43 under the control of a second thyristor 45 adapted to be gated by a signal from logic circuit 37 via a lead L7. The output voltage from autotransformer 43, which is manually adjustable, is provided by a lead L9 to dribble vibrator 31.

The system includes a provision for cyclic control of weighing the product so as to provide for weighing of repetitive batches of the product, the cyclic control being such as to carry out a given cycle rate of weight, i.e., a given number of batches (each of predetermined finish weight) per minute. For this purpose a timer comprises a timing motor 47 which is supplied with a.c. power by means of a representative lead L11 and a plurality of cams 49A–49E driven by motor 47 and operating respective switches LSA, LSB, LSC, LSD and DPS so as to momentarily close each switch in sequence.

Each of these five cam-operated switches is interconnected with logic circuit 37. Operation of switches LSA and LSB defines the limits, i.e., the beginning and end of a first time period or band, during a weighing cycle, referred to hereinafter as the bulk band. Operation of switches LSC and LSD similarly defines the limits of a second period, or so-called dribble band, during a weighing cycle. Switch DPS may be referred to as the dump switch and controls energization of the dump solenoid 23. Accordingly, switches LSA, LSB, LSC, LSD and DPS provide for operation of the system on a time basis.

Such operation is carried out on a principle that, during each weighing cycle (i.e., during the weighing of each batch of the product), the product delivered to the scale must reach a predetermined total first weight during the bulk band and must reach a predetermined total second weight during the dribble band. At the first weight, delivery by bulk conveyor 15 is terminated and at the second weight, delivery by dribble conveyor 17 is terminated. If such weights are not reached within the respective bands, change is automatically made in the product delivery rate or the out-of-band condition signalled.

Switches BS and DS interconnected with logic circuit 37 are operable by the scale at the predetermined first and second weights, respectively. Switch BS may be referred to as the bulk switch and is momentarily closed when the product delivered to scale 21 reaches the total first weight. Switch DS may be referred to as the dribble switch and is momentarily closed when the product delivered to scale 21 reaches the total second weight. Scale 21 includes, of course, suitable provision (not shown) for adjusting the weights at which bulk switch BS and dribble switch DS close.

Logic circuit 37 is of conventional design and may employ suitable relays or standard integrated circuit components to provide functions which will be apparent from a description hereinbelow of the system's operation. For example, the bulk and dribble periods may each be defined by respective unijunction transistor (UJT) timing circuits such as are disclosed on page 788 of *The Sourcebook of Electronic Circuits*, J. Markus, ed., McGraw-Hill, 1968.

Figure 2:
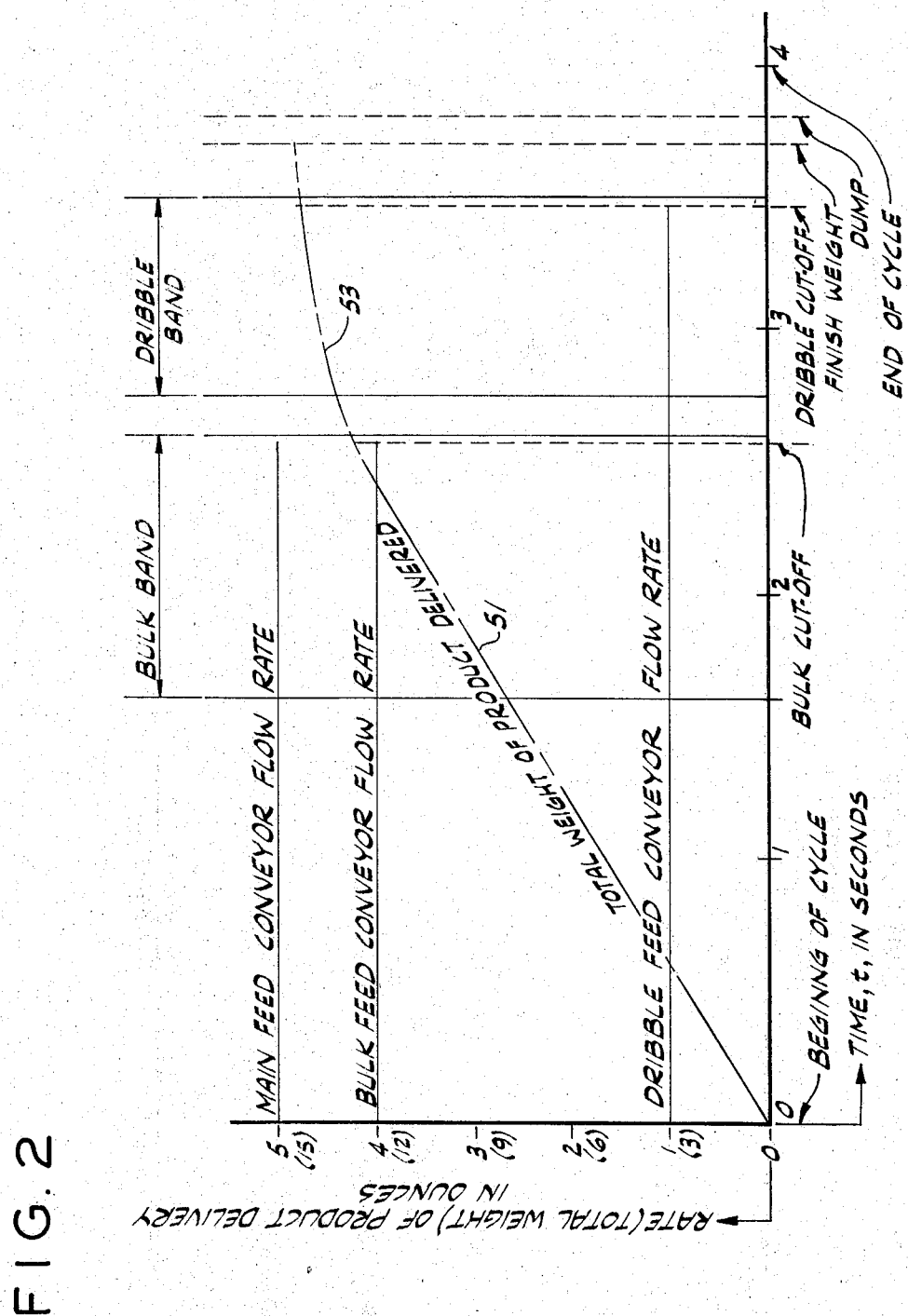
FIG. 2 is a timing diagram and graph useful in explaining the invention.

Operation of the system may be considered more specifically with reference to FIG. 2, which is both a timing diagram and a graph showing the rate of product delivery by conveyors 13, 15 and 17 and the amount of product delivered by the conveyors to scale 21 as the function of time.

As controlled by the cam-operated switches driven by timing motor 47, the beginning of a normal cycle for weighing a batch of the product may be assumed to begin with the completion of dumping (through closure of dump switch DPS) of the previous batch from scale bucket 19. In FIG. 2, this is assumed to be at a time, T=0 seconds and signals are provided by circuit 37 via leads L3 and L7 for gating thyristors 35 and 45, respectively. Thus main and bulk vibrators 27 and 29 as well as dribble vibrator 31 are energized to initiate delivery of product by main feed conveyor 13 to the bulk and dribble feed conveyors 15 and 17 and to initiate delivery of product to scale bucket 19 by bulk conveyor 15 at the nominal bulk delivery rate, e.g., 4 oz./sec. and by dribble conveyor 17 at the nominal dribble delivery rate, e.g., 1 oz./sec. Accordingly, product is accumulated in scale bucket 19 at a rate of 5 oz./sec. as represented by the linear position 51 of the curve in FIG. 2 representative of the total weight of product delivered to scale bucket 19.

At a predetermined time such as t=1.6 seconds approximately, the beginning of the bulk band is signalled by momentary closure of switch LSA. Delivery of the product to scale bucket 19 by bulk and dribble conveyors 15 and 17 normally continues until the total weight Of product weighed by scale 21 reaches the predetermined weight, e.g., about 13 oz., at which bulk switch BS closes, causing the gating signal provided by lead L3 to thyristor 35 to be terminated. Hence, vibrators 27 and 29 cease operation and this has the effect of terminating delivery of the product to scale bucket 19 by bulk conveyor 15 at a time shown in FIG. 2 as slightly less than t=2.6 seconds. Thereafter, closure of switch LSB terminates the bulk band which is thus seen to be an interval of about 1 second.

Regardless of the time at which delivery by bulk conveyor 15 is cut off, a small additional amount of product such as 0.88 oz. which is in suspension, i.e., is still falling from the bulk conveyor toward scale bucket 19, will slightly increase the total weight of the product in the scale bucket. Operation of dribble conveyor 13 continues following cut-off of the bulk conveyor.

Shortly after termination of the bulk band, the beginning of the dribble band is initiated by closure of switch LSC and operation of dribble conveyor 17 continues into the dribble band in order to bring the total weight of product in scale bucket 19 up to the predetermined finish weight. However, delivery of the product to the scale bucket is at the substantially lower dribble rate, e.g., about 1 oz./sec. and thus the weight of product in the scale bucket increases more slowly as shown by the curve portion 53 to more accurately approach the finish weight.

The dribble conveyor is cut off by the closure of dribble switch DS causing gating of the thyristor 45 to cease at a dribble cut-off weight, i.e., a second predetermined total weight of the product in scale bucket 19 which is sufficient to insure that the small additional amount (e.g., 0.176 oz.) of product in suspension, i.e., falling from dribble conveyor 17 the scale bucket 19 at dribble cut-off, will bring the batch in scale bucket 19 to the finish weight, e.g., about 14.5 oz. in the present example. After dribble cut-off, the end of the dribble band is signalled by closure of switch LSD at t=3.5 seconds approximately, the finish weight being attained at a slightly later time as indicated, though not necessarily so.

Thereafter, dump switch DPS closes as indicated at about t=3.8 seconds to energize dump solenoid 23, dumping the weighed batch from scale bucket 19. The completion of dumping terminates the cycle and a new weighing cycle then begins. In the present example, the cycle is seen to be of 4 seconds duration.

A cycle is other than normal if closure of bulk switch BS does not occur within the bulk band or closure of dribble switch DS does not occur within the dribble band. If bulk switch BS closes before closure of switch LSA (signalling the beginning of the bulk band), logic circuit 37 includes provision for energizing a signal lamp SL1 to signal that the rate of product delivery should be manually adjusted. If bulk switch BS closes after closure of switch LSB (signalling the end of the bulk band), another signal lamp SL2 is energized by logic circuit 37 signalling that the rate of product delivery should be increased. Logic circuit 37 may include provision for causing signal lamps SL1 or SL2 to remain on only for a short period such as 3 seconds.

If dribble switch DS closes before the beginning of the dribble band (as signalled by closure of switch LSC), logic circuit 37 provides a suitable signal to a conventional timer 55 for causing energization of servo 39 for a short interval such as 600 msec. in a direction for decreasing the output voltage of autotransformer 33. This has the effect of reducing the amplitude of vibration of main conveyor vibrator 27 and bulk conveyor vibrator 29. In this way, there is made a small decrease in the rate of product delivery by main conveyor 13 and bulk conveyor 15 so as to tend to cause the dribble switch to close within the dribble band on subsequent cycles. If, in the following cycle, dribble switch DS closes before the beginning of the dribble band, servo 39 is again energized for the 600 msec. interval, for example.

Accordingly, corrections are made in each cycle until the rate at which product is delivered to scale bucket 19 by bulk conveyor 15 is at a rate which will cause dribble switch DS to close within the dribble band. Similarly, if dribble switch DS closes after the end of the dribble band (signalled by closure of switch LSD), logic circuit 37 signals timer 55 for energizing servo 39 for a short interval (e.g., again 600 msec.) in the reverse direction so as to increase the amplitude of vibration of vibrators 27 and 29 and thereby to increase the main and bulk delivery rates. Such corrections are then carried out on subsequent cycles until dribble switch DS closes within the dribble band.

Although it is apparent that, as between dribble conveyor 17 and bulk conveyor 15, only the product delivery rate of the latter is varied automatically, it may be observed that automatic control of the delivery rate of dribble conveyor 17 may be accomplished in similar manner such as by using a servo for controlling the output voltage of autotransformer 43 in the same or similar way that servo 39 controls that of autotransformer 33. Thus at least one or both of the bulk-and-dribble delivery rates may be automatically changed if the product delivered to the scale does not attain predetermined total weight during the bulk or dribble bands.

In any event, control of the rate of product delivery to the scale is seen to be automatic. Under such automatic control, each scale function occurs within a reasonable band of time, i.e., within the bulk and dribble bands. Thus, these bands define ideal periods during which certain weights of product delivered to the scale are to be attained. The system thereby achieves accurate weighing during each weighing cycle regardless of the various factors noted previously which tend to affect product delivery or flow rate. This obviates the need for any additional sensors, check weighers or additional (duplicate) scales.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of weighing repetitive batches of a fluent product, each batch being of predetermined finish weight, comprising the steps of:
   1. initiating the delivery of the fluent product to a scale via first feed means at a first delivery rate;
   2. initiating delivery of the product to the scale via second feed means at a second delivery rate which is substantially lower than said first rate;
   3. terminating delivery of the product to the scale at said first rate when a predetermined total first weight of product delivered to the scale is weighed by the scale;
   4. terminating delivery of the product at said second rate when a predetermined total second weight of product delivered to the scale is weighed by the scale whereby a batch of said predetermined finish weight is accumulated on the scale;
   5. establishing a predetermined time interval during which the predetermined total second weight of product weighed by the scale is to be reached;
   6. automatically changing at least one of said first and second delivery rates if the predetermined total second weight weighed by the scale is not reached within said time interval so as to cause said predetermined second weight weighed by the scale to be reached within said time interval;
   7. discharging from the scale the product batch of said predetermined finish weight; and
   8. repeating steps (1) through (7).

2. A method of weighing repetitive batches of a fluent product as set forth in claim 1, wherein said automatically changing at least one of said rates comprises decreasing said first delivery rate if said second weight is reached before said interval and for increasing said first delivery rate if said second weight is reached after said interval.

3. A method of weighing repetitive batches of a fluent product as set forth in claim 2, further comprising establishing another predetermined time interval during which the predetermined total first weight of product weighed by the scale is to be reached and signalling if said first weight is not reached during the last said interval.

4. An automatic scale control system for weighing of repetitive batches of a fluent product, each batch being of predetermined finish weight, comprising:
   a product weight-measuring scale including means for receiving the fluent product for weighing it and means for subsequently discharging a batch of the weighed product;
   first feed means for delivering the product from a supply thereof to the scale at a preselected first delivery rate;
   second feed means for delivering the product from the supply thereof to the scale at a preselected second delivery rate which is lower than the first delivery rate;
   means for initiating delivery of the product by the first and second feed means;
   means operable by the scale for terminating delivery by the first feed means when the product delivered to the scale reaches a predetermined total first weight;
   means operable by the scale for terminating delivery by the second feed means when the product delivered to the scale reaches a predetermined total second weight;
   means for establishing a predetermined time interval during which the product delivered to the scale is to reach one of said predetermined total first or second weights; and
   means for automatically changing at least one of said delivery rates if said one of the predetermined total first and second weights of product is not delivered within said predetermined time interval so as to cause said one of the predetermined total first or second weights of product to be delivered to the scale within said predetermined time interval.

5. An automatic scale control system as set forth in claim 4, wherein said first and second feed means each comprise vibrator conveyors including respective vibrators, the amplitude of vibration of said vibrators determining the respective conveyor delivery rate, and further comprising means for controlling the level of energization of said vibrators from a source of a.c. power and thereby the amplitude of vibration of said vibrators.

6. An automatic scale control system as set forth in claim 5, wherein the means for controlling vibrator energization comprises at least one voltage-adjustable transformer supplying its output voltage to at least one of the vibrators and a motor for controlling the output voltage of the transformer.

7. An automatic scale control system as set forth in claim 6, further comprising a timer for operating said motor for a time interval.

8. An automatic scale control system as set forth in claim 4, wherein said means for automatically changing one of said delivery rates is operative to change said first delivery rate if said predetermined total second weight of product is not delivered within said predetermined time interval.

9. An automatic scale control system as set forth in claim 8, wherein said means for automatically changing delivery rates is operative to decrease said first delivery rate if said second weight is delivered before said predetermined interval and to increase said first rate if said second weight is delivered after said predetermined interval.

10. An automatic scale control system as set forth in claim 8, wherein said means for establishing a predetermined time interval comprises a timer for controlling cyclic operation of said system, each batch being weighed during a cycle of operation, said predetermined time interval occurring within each cycle.

11. An automatic scale control system as set forth in claim 10, wherein said means for initiating delivery of the product by the first and second feed means is controlled by said timer, and further comprising means controlled by said timer for causing the discharging means of said scale to discharge the weighed product batch in each cycle.

12. An automatic scale control system as set forth in claim 10, said timer establishing another predetermined time interval within each cycle during which the product delivered to the scale is to reach said predetermined total first weight and further comprising means for signalling if said predetermined total first weight is not delivered within the last-said interval.

13. An automatic scale control system as set forth in claim 12, wherein said means for signalling provides a first signal if said first weight is delivered before the last-said interval and a second signal if said first weight is delivered after the last-said interval.

14. An automatic scale control system for weighing of repetitive batches of a fluent product, each batch being of predetermined finish weight, comprising:
  a product weight-measuring scale including means for receiving the fluent product for weighing and means for subsequently discharging a batch of the weighed product;
  bulk feed means for delivering the product from a supply thereof to the scale at a preselected bulk delivery rate;
  dribble feed means for delivering the product from the supply thereof to the scale at a preselected dribble delivery rate which is lower than the bulk delivery rate;
  means for initiating delivery of the product by the bulk feed means and dribble feed means;
  means operable by the scale for terminating delivery by the bulk feed means when the product delivered to the scale reaches a predetermined total first weight;
  means operable by the scale for terminating delivery by the dribble feed means when the product delivered to the scale reaches a predetermined total second weight whereby a batch of said predetermined finish weight is delivered to the scale;
  means for establishing a predetermined time interval during which the product delivered to the scale is to reach said predetermined total second weight;
  means for automatically changing said preselected bulk delivery rate if the product delivered within said predetermined time interval does not reach said predetermined second weight so as to cause said predetermined total second weight of product to be delivered to the scale within said predetermined time intervals; and
  means for causing the discharging means of said scale to discharge the product batch of said predetermined finish weight.

15. An automatic scale control system as set forth in claim 14, wherein said means for establishing a predetermined time interval comprises a timer for controlling cyclic operation of said system, each batch being weighed during a cycle of operation, said predetermined time interval occurring within each cycle, and said timer controlling also said means for initiating delivery of the product and said means for causing the discharging means to discharge the product batch.

* * * * *

UNITED STATES PATENT OFFICE
CERTIFICATE OF CORRECTION

Patent No. 3,856,097    Dated December 24, 1974

Inventor(s) John S. Bartlo et al.

It is certified that error appears in the above-identified patent and that said Letters Patent are hereby corrected as shown below:

The following has been omitted form the front page of the patent -- [73] Assignee: Hayssen Manufacturing Company, Sheboygan, Wisconsin --.

Item [76] should read as follows: -- John S. Bartlo, Ridgewood, N. J.; Richard W. Safranski, Charles G. Hart, Sheboygan, Wisconsin: David A. Wieseckel, Milwaukee, Wisconsin --.

Item [62], "Feb. 5, 1973" should read -- Jan. 5, 1973 --.

Column 1, line 24, "of" should read -- on --.

Column 2, line 25, "products" should read -- product --.

Column 5, line 26, "Of" should read -- of --; line 55, "of the thyristor" should read -- of thyristor --.

Signed and Sealed this twenty-fifth Day of May 1976

[SEAL]

Attest:

RUTH C. MASON
*Attesting Officer*

C. MARSHALL DANN
*Commissioner of Patents and Trademarks*